July 12, 1949.   F. FISHER   2,476,033
OPERATING SYSTEM FOR ELECTRIC FENCES
Filed March 14, 1946
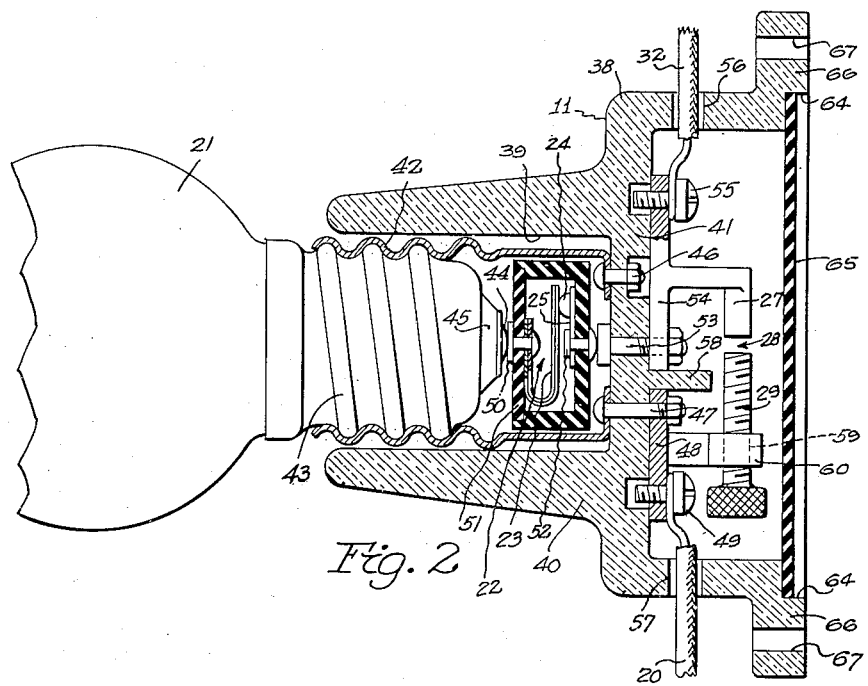
Fig. 2
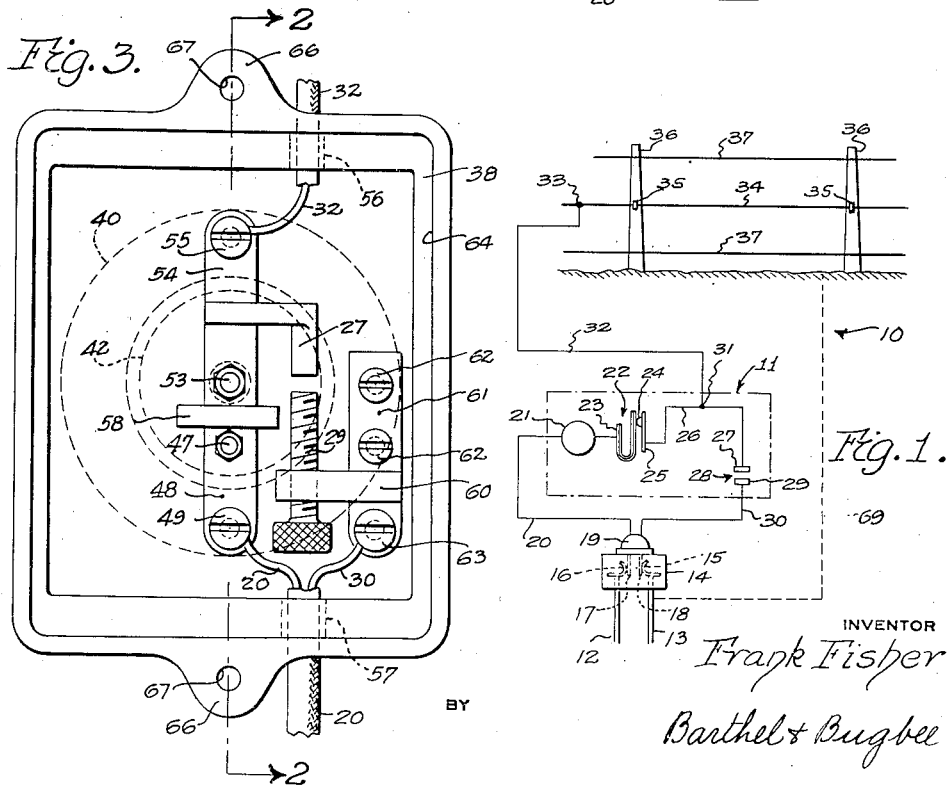
Fig. 3
Fig. 1
INVENTOR
Frank Fisher
Barthel & Bugbee
BY
ATTORNEYS Patented July 12, 1949

2,476,033

UNITED STATES PATENT OFFICE 2,476,033

OPERATING SYSTEM FOR ELECTRIC FENCES

Frank Fisher, Owosso, Mich.

Application March 14, 1946, Serial No. 654,353

4 Claims. (Cl. 177—311)

This invention relates to fences and in particular to electric devices for preventing animals from breaking through such fences.

One object of this invention is to provide an electric fence and a controller therefor energized from a house lighting circuit and operable to deliver a shock to an animal rubbing against the fence by reason of the ground connection established through the body of the animal.

Another object is to provide an electric fence and a controller therefor energized from a house lighting circuit by means of a two-wire supply circuit containing an electric light bulb and a spark gap disposed on the opposite side of the bulb from the conductor leading from the circuit to the fence.

Another object is to provide an electric fence and a controller therefor, as set forth in the preceding objects, wherein a thermally-operated interrupter is connected in series with the supply circuit for periodically interrupting the supply circuit to the fence when an animal rubs against the fence and thereby establishes a ground connection through its body.

Another object is to provide an electric fence and a controller therefor, as set forth in the preceding objects, which is substantially free from moving parts and wherein the supply circuit to the fence is normally de-energized until the fence is grounded through the body of an animal rubbing against it.

Another object is to provide an electric fence and a controller therefor, as set forth in the preceding objects, wherein a suitable electric light bulb, preferably a neon bulb, serves not only to add resistance to the circuit and thereby prevent current of a dangerous voltage reaching an animal rubbing against the fence, but also to indicate when the circuit is energized by an animal rubbing against the fence and thereby grounding the circuit through its body.

Other objects and advantages of the invention will become apparent during the course of the following description of the accompanying drawings, wherein:

Figure 1 is a schematic wiring diagram of an electric fence circuit according to a preferred embodiment of the present invention;

Figure 2 is a central vertical section through a controller device employed in the circuit of Figure 1, taken along the line 2—2 in Figure 3;

Figure 3 is a bottom plan view of the controller device shown in Figure 2 with the cover plate removed to expose the spark gap therein.

Referring to the drawings in detail, Figure 1 shows an electric fence circuit generally designated 10, containing a controller generally designated 11, according to a preferred embodiment of the invention. The electric fence circuit 10 is energized from an ordinary house lighting circuit 12, 13 connected to the conventional outlet 14 with contact members 15 and 16. The latter are engaged by the prongs 17 and 18 of an ordinary connection plug 19.

Running from the prong 17 of the connection plug 19 is a line 20 leading to a lamp 21, preferably a neon lamp, to the other side of which is connected a thermally-operated intermittent circuit breaker 22 containing a bi-metallic element 23 engageable with the contact 24 of an arm 25, which in turn is connected through a conductor 26 to one pole 27 of a spark gap 28. The opposite pole 29 of the spark gap 28 is connected by the line 30 to the prong 18 of the connector plug 19 and thence to the house lighting line 13.

Connected as at 31 to the conductor 26 between the lamp 21 and the spark gap 28 is a fence supply line 32 connected as at 33 to the live wire 34 of the fence. The live wire 34 is mounted upon insulators 35 which in turn are mounted upon the fence posts 36 placed at intervals around the enclosure in which the live stock are located and which it is desired to protect. Also strung around the enclosure and between the fence posts 36 are uninsulated fence wires 37.

The controller 22 consists of a weatherproof casing 38, preferably of insulating material, having recesses 39 and 40 formed on opposite sides of a partition wall 41. The recess 39 is relatively deep and contains a threaded socket 42 of conducting material for threadedly receiving the threaded base 43 of the electric lamp 21. The latter is of a conventional type, preferably a neon lamp, and has the usual central contact 44 separated from the threaded base 43 by the annular insulating member 45. (Figure 2). The lamp socket 42 is secured to the partition wall 41 at the bottom of the recess 39 by fasteners 46 and 47, the latter engaging the conductor 48 to which the line 20 is connected, as by the screw 49.

The central contact 44 of the lamp 21 is connected to a contact member 50 located in the insulated casing 51 of the intermittent circuit interrupter 22. The contact member 50 extends through one wall of the casing 51 and serves as a fastener for securing thereto the U-shaped bi-metallic element 23. The latter, as previously stated, engages the contact 24 on the arm 25 secured to the opposite wall of the casing 51 from the contact fastener 50 by the fastener 52, which in turn engages the contact fastener 53. The circuit interrupter 22 is optionally included in the circuit and may be omitted entirely, whereupon the threaded socket 42 is shortened so that the central contact 44 of the lamp 21 may be screwed directly into contact with the contact fastener 53.

The contact fastener 53 extends through the partition wall 41 and serves to secure to the opposite side thereof the base portion 54 of the pole 27 of the spark gap 28. The fence supply line 32 is connected to the spark gap pole base 54 as by the screw 55 and passes outward through the hole 56 in the controller casing 38. Likewise, the line 20 leading to the connector screw 49 passes through a hole 57 in the controller casing 38. In order to separate the base 54 from the conductor 48 and prevent arcing therebetween, a projecting wall 58 integral with the partition wall 41 extends transversely therefrom between the adjacent ends of the conductors 48 and 54.

The opposite pole 29 from the pole 27 of the spark gap 28 consists of a screw-threaded member threaded through a threaded bore 59 in an arm 60, the opposite end of which is secured to a base portion 61 which in turn is secured to the partition wall 41 by the fasteners 62. The base portion 61 is also provided with a connector screw 63 to which the line 30 is connected, so as to complete the electrical circuit between the spark gap pole 29 and the prong 18 of the connector plug 19, as previously described.

The controller casing 38 in the bottom thereof is provided with a shallow recess 64 in which is mounted a closure plate 65 of insulating material, thereby closing the spark gap chamber 40. The bottom of the controller casing 38 is provided with a marginal flange 66 containing holes 67 through which fasteners (not shown) are inserted for anchoring the controller 22 to any suitable or convenient structure.

In the operation of the invention, the electric lamp 21, preferably of 10 to 25 watts rating, is screwed into the lamp socket 42 either with or without the circuit interrupter 22, and the various connections are made as previously described. The spark gap 28 is adjusted at the factory to prevent arcing by current of the ordinary houselighting voltage such as 110 volts, yet to pass high voltage discharges caused by lightning striking any part of the circuit 10. The connector plug 19 is then plugged into the outlet 14 thereby placing the circuit in condition for energization when an animal rubs against the fence wire 34. Energization is prevented, in the absence of the animal, by the spark gap 28.

When an animal rubs against the live wire 34 of the fence, he establishes a connection through his body from the live wire 34 to the ground 68, thereby completing the circuit to the house lighting circuit 12, 13 which is also grounded, as indicated by the dotted line 69 (Figure 1). When this occurs, the animal receives a shock and instinctively recoils from the fence. If the thermal-circuit interrupter 22 is employed, it makes and breaks the circuit periodically by the heating of the bi-metallic element 23 and its consequent pulling away from the contact 24. This enables the animal to break away from the live wire 34 while it is momentarily de-energized.

In practice, however, it has been found that the circuit-interrupter 22 may be safely omitted, provided that a lamp 21 of 10 to 25 watts rating is employed, depending upon the time of the year and the kind of livestock enclosed by the fence. A 10 watt lamp has been found suitable for hogs and a 15 watt lamp for cattle. If, during the use of the fence, lightning strikes any part of the circuit, it will jump across the spark gap 28, which normally prevents completion of the circuit through the line 30.

While I have shown and described my invention in detail, it is to be understood that the same is to be limited only by the appended claims, for many changes may be made without departing from the spirit and scope of my invention.

What I claim is:

1. An operating device for an electric fence comprising a controller housing having therein a controller circuit containing an electric light bulb, an auxiliary grounded circuit connected to said controller circuit and containing a spark gap, a pair of terminals in said housing arranged for connection to an external house lighting circuit, one of said terminals being also connected to said controller circuit and the other terminal being also connected to said spark gap, and a third terminal in said housing arranged for connection to an external fence supply line and also connected to said controller circuit between said bulb and said spark gap, said controller housing comprising a casing having a central partition thereacross, with said spark gap secured to one side of said partition and a light bulb recess containing a light bulb socket on the other side of said partition.

2. An operating device for an electric fence comprising a controller housing having therein a controller circuit containing an electric light bulb, an auxiliary grounded circuit connected to said controller circuit and containing a spark gap, a pair of terminals in said housing arranged for connection to an external house lighting circuit, one of said terminals being also connected to said controller circuit and the other terminal being also connected to said spark gap, and a third terminal in said housing arranged for connection to an external fence supply line and also connected to said controller circuit between said bulb and said spark gap, said controller housing comprising a casing having a central partition thereacross, with said spark gap secured to one side of said partition and a light bulb recess containing a light bulb socket on the other side of said partition, said light bulb socket having two electrical connections therein for said light bulb, one of said socket connections extending through said partition into electrical engagement with one pole of said spark gap.

3. An operating device for an electric fence comprising a controller housing having therein a controller circuit containing an electric light bulb, an auxiliary grounded circuit connected to said controller circuit and containing a spark gap, a pair of terminals in said housing arranged for connection to an external house lighting circuit, one of said terminals being also connected to said controller circuit and the other terminal being also connected to said spark gap, and a third terminal in said housing arranged for connection to an external fence supply line and also connected to said controller circuit between said bulb and said spark gap, said controller housing comprising a casing having a central partition thereacross, with said spark gap secured to one side of said partition and a light bulb recess containing a light bulb socket on the other side of said partition, said light bulb socket having two electrical connections therein for said light bulb, one of said socket connections extending through said partition into electrical engagement with one pole of said spark gap, and the other of said socket connections extending through said partition to a terminal for electrical engagement by said house lighting circuit.

4. An operating device for an electric fence comprising a controller housing having therein a controller circuit containing an electric light bulb, an auxiliary grounded circuit connected to said controller circuit and containing a spark gap, a pair of terminals in said housing arranged for connection to an external house lighting circuit, one of said terminals being also connected to said controller circuit and the other terminal being also connected to said spark gap, and a third terminal in said housing arranged for connection to an external fence supply line and also connected to said controller circuit between said bulb and said spark gap, said controller housing comprising a casing having a central partition thereacross, with said spark gap secured to one side of said partition and a light bulb recess containing a light bulb socket on the other side of said partition, said light bulb socket having two electrical connections therein for said light bulb, one of said socket connections extending through said partition into electrical engagement with one pole of said spark gap, and the other of said socket connections extending through said partition to a terminal for electrical engagement by said house lighting circuit, said casing having openings therethrough for the connection of said fence supply line and of said house lighting circuit to their respective terminals.

FRANK FISHER.

REFERENCES CITED

The following references are of record in the file of this patent:

UNITED STATES PATENTS

| Number | Name | Date |
| --- | --- | --- |
| Re. 19,922 | Gengler | Apr. 7, 1936 |
| 2,315,757 | Wenger | Apr. 6, 1943 |
| 2,398,442 | Moore | Apr. 16, 1946 |

OTHER REFERENCES

Article on pages 419 and 130A of the September 1938 issue of Popular Mechanics.